United States Patent Office 3,636,079
Patented Jan. 18, 1972

3,636,079
METHYL N-(3-CHLORO-4-BROMO
PHENYL) CARBAMATE
Karl-Heinz Koenig, Ludwigshafen (Rhine), and Adolf Fischer, Mutterstadt, Pfalz, Germany, assignors to Badische Anilin- & Soda-Fabrik Aktiengesellschaft, Ludwigshafen (Rhine), Germany
No Drawing. Filed Mar. 25, 1968, Ser. No. 715,546
Claims priority, application Germany, Apr. 6, 1967,
P 16 42 221.2
Int. Cl. C07c 125/06
U.S. Cl. 260—471 C
1 Claim

ABSTRACT OF THE DISCLOSURE

Substituted methyl N-phenylcarbamates and a method for controlling unwanted plants with said compounds.

The present invention relates to new substituted methyl N-phenylcarbamates and a method for controlling unwanted plants with said compounds. In particular it relates to methyl N-phenylcarbamates whose phenyl ring bears two substituents.

It is known that carbamic esters, e.g. methyl N-(3,4-dichlorophenyl)-carbamate, may be used as herbicides (U.S. patent specification 3,116,995). However their action is not satisfactory.

An object of the present invention is to provide valuable new substituted methyl N-phenylcarbamates, especially those whose phenyl radical bears two substituents. Another object of the present invention is to provide a method for controlling unwanted plants with substituted methyl N-phenylcarbamates, especially for controlling unwanted plants in crops without damaging the crop plants.

These and other objects of the invention are achieved with compounds having the formula

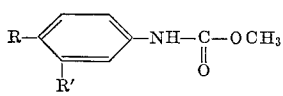

in which R denotes a halogen atom or a nitro, monochloromethyl, dichloromethyl, trichloromethyl, trifluoromethyl, methyl or mesyl group and R' denotes a halogen atom or a nitro, monochloromethyl, dichloromethyl, trichloromethyl, trifluoromethyl, methyl, mesyl or methoxy group, R and R' however not denoting chlorine simultaneously.

The substances according to the invention may be prepared, inter alia, by transformation of an m-substituted aniline with phosgene into the corresponding isocyanate and then introducing the p-substituents. However m-substituted nitrobenzene may also be used as the starting material; after introducing the p-substituents the product is reduced to the corresponding aniline, the latter reacted with phosgene and the isocyanate formed is reacted with methanol. Another method is to react the substituted aniline with methyl chlorocarbonate in the presence of acid-binding agents.

Most of the monomethyl carbamates according to the invention are readily crystallizable compounds which are insoluble in water but very readily soluble in many organic solvents.

The following example illustrates the method of preparation.

PREPARATION OF METHYL (N-(4-BROMO-3-CHLOROPHENYL)CARBAMATE 20 parts by weight of methanol is dripped cold into a solution of 116 parts by weight of 4-bromo-3-chlorophenyl isocyanate in 50 parts by weight of toluene. The solution is then heated, kept at the boil for 2 to 3 hours and then evaporated. After recrystallization from a mixture of benzene and cyclohexane methyl N-(4-bromo-3-chlorophenyl)carbamate is obtained with a melting point of 103 to 104° C.

The following carbamates may be obtained by analogous methods:

methyl N-(4-fluoro-3-bromophenyl)carbamate,
M.P. 83° to 84° C.
methyl N-(3-trifluoromethyl-4-chlorophenyl)carbamate,
M.P. 89° to 90° C.
methyl N-(3-chloro-4-methylphenyl)carbamate,
M.P. 61° to 62° C.

It has been found that particularly good herbicidal properties are exhibited by those monomethyl carbamates which bear strongly electronegative substituents in the 3- and 4-positions of the phenyl ring, it generally being necessary for one of these substituents to be particularly strongly electronegative (e.g. the bromine, nitro or mesyl substituent).

The agents according to this invention may be used as solutions, emulsions, suspensions or dusts.

The form of application depends entirely on the purpose for which the agents are being used; in any case it should ensure a fine distribution of the active ingredient.

For the preparation of solutions to be sprayed direct, mineral oil fractions with medium to high boiling points such as kerosene or diesel oil, coal-tar oils and oils of vegetable and animal origin, cyclic hydrocarbons, such as tetrahydronaphthalene, and alkylated naphthalenes are suitable.

Aqueous formulations may be prepared from emulsion concentrates, pastes or wettable powders by adding water. To prepare emulsions the ingredients as such or dissolved in a solvent may be homogenized in water by means of wetting or dispersing agents. Concentrates which are suitable for dilution with water may be prepared from active ingredient, emulsifying or dispersing agent and possibly solvent.

Dusts may be prepared by mixing or grinding the active ingredients with a solid carrier.

The following example illustrates the application of the herbicides.

EXAMPLE

The plants Indian corn (Zea Mays) barley (Hordeum vulgare), rice (Oryza sativa), wild mustard (Sinapis arvensis), white goose-foot (Chenopodium album), small nettle (Urtica urens), barnyard grass (Panicum crus galli) and green foxtail (Setaria viridis) were treated at a growth height of 4 to 12 cm. with methyl N-(3-chloro-4-bromophenyl)carbamate (I) and, for comparison with methyl N-(3,4-dichlorophenyl)carbamate (II), each at a rate of 4 kg. of active ingredients per hectare dispersed in 500 liters of water.

After 3 to 4 weeks it was observed that active ingredient I was better tolerated by the crop plants and exhibited a stronger herbicidal action than active ingredient II.

The results of the experiment can be seen from the following table.

|  | Active ingredient | |
|---|---|---|
|  | I | II |
| Crop plants: | | |
| Indian corn | 0–10 | 10–20 |
| Barley | 0–10 | 20 |
| Rice | 0 | 10–20 |
| Unwanted plants: | | |
| Wild mustard | 90–100 | 90 |
| White goosefoot | 90–100 | 80 |
| Small nettle | 100 | 90 |
| Barnyard grass | 80–90 | 70 |
| Green foxtail | 90–100 | 80 |

NOTE:
0 = No injury.
100 = Complete kill.

The following are examples of compounds which have the same biological action as I:

methyl N-(3,4-dibromophenyl)carbamate
methyl N-(3-chloro-4-fluorophenyl)carbamate
methyl N-(3-chloro-4-iodophenyl)carbamate
methyl N-(3-fluoro-4-chlorophenyl)carbamate
methyl N-(3-bromo-4-chlorophenyl)carbamate
methyl N-(3-nitro-4-bromophenyl)carbamate
methyl N-(3-mesyl-4-chlorophenyl)carbamate
methyl N-(4-chloro-3-methylphenyl)carbamate
methyl N-(4-chloro-3-trifluoromethylphenyl)carbamate The active ingredients may also be used in admixture with other active compounds for completing or enhancing specially desired effects.

We claim:
1. Methyl N-(3-chloro-4-bromophenyl)carbamate.

References Cited
UNITED STATES PATENTS

| 2,857,260 | 10/1958 | Woodward | 260—471 |
| 3,116,995 | 1/1964 | Williard et al. | 260—471 |
| 3,253,904 | 5/1966 | Harrison | 260—471 |

JAMES A. PATTEN, Primary Examiner

L. A. THAXTON, Assistant Examiner

U.S. Cl. X.R.
71—111; 260—470